No Printed Specification Available
9796X
E. Richards,
Spoke Share,
Patented June 28, 1836.
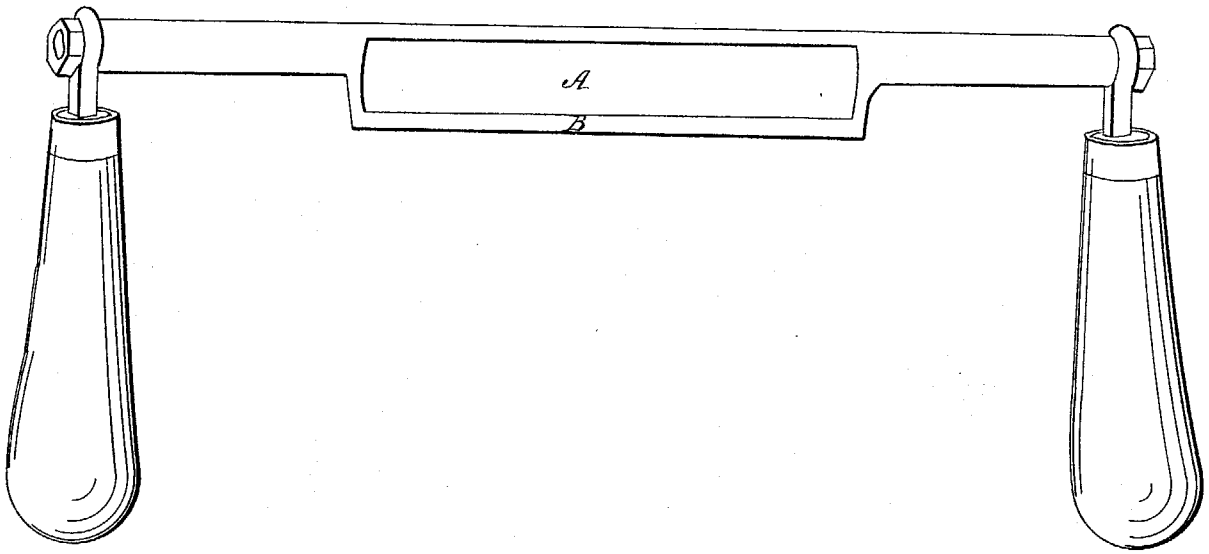
AM. PHOTO-LIT'HG. CO. N.Y. (OSBORNE'S PROCESS)

6/28/1836 9796x

June 28.1836 9.

Edmund Richards of Hingham Massachusetts
Letters Patent (Patented June 28. 1836)

The Schedule referred to in these Letters Patent, and making part
of the same containing a description in the words of the said Ed-
mund Richards himself of his improvement in the construction
and form of the Drawing Knife.

To all people to whom these presents shall come. Be it known
that I Edmund Richards of Hingham in the County of Plymouth
and Commonwealth of Massachusetts, machinist, have invented
a new and useful improvement in the construction and form
of the Drawing Knife the Instrument used by House wrights
and other workers in wood, and that the following is a full
and accurate description thereof.

Richards Concave Drawing Knife. The improvement of
this Drawing Knife over those in common use consists
First in making the blade of the Knife concave on both
sides, Second in attaching the handles of this instrument
to the ends thereof by a screw and nut. by which they may
be taken off reversed and placed upon the instrument
again so as to use both sides of the Knife The advantages of the improvement are. First, The con-
cave blade causes less friction than the convex or plane blade
and consequently works with greater ease and exactness.
Second — Owing to its concave form the improved instrument
is more easily sharpened — Third, by the movable handles
the instrument may be used on both sides, so that it will
wear equally on both sides when used.

What I claim as my own Invention and
not previously known in the above described improvement
is, First, the concave blade and second the movable han
dles by which the advantages before mentioned are obtained.

6/28/1836 9796X

10.

Dated at Hingham aforesaid this Sixteenth day of May in the year One thousand Eight hundred and thirty six Witnesses
Elisha Cushing
Solomon Lincoln Edmund Richards (Patented 28 June 1836)

Fwd
JHT (220 and)

(Rec'd & Recorded anew July 7. 1838)

(Drawing)